(12) United States Patent
Li et al.

(10) Patent No.: US 11,310,790 B2
(45) Date of Patent: Apr. 19, 2022

(54) FREQUENCY DOMAIN RESOURCE ADJUSTMENT METHOD AND APPARATUS, INDICATION INFORMATION SENDING METHOD AND APPARATUS, AND SYSTEM

(71) Applicant: Huawei Technologies Co., Ltd., Shenzhen (CN)

(72) Inventors: Hua Li, Shanghai (CN); Hao Tang, Shanghai (CN); Yi Wang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 16/786,206

(22) Filed: Feb. 10, 2020

(65) Prior Publication Data

US 2020/0178252 A1    Jun. 4, 2020

Related U.S. Application Data

(63) Continuation of application No. PCT/CN2018/097085, filed on Jul. 25, 2018.

(30) Foreign Application Priority Data

Aug. 11, 2017    (CN) .......................... 201710687298.1

(51) Int. Cl.
*H04W 72/04* (2009.01)
*H04L 5/00* (2006.01)
*H04W 72/12* (2009.01)

(52) U.S. Cl.
CPC ....... *H04W 72/0446* (2013.01); *H04L 5/0053* (2013.01); *H04L 5/0094* (2013.01);
(Continued)

(58) Field of Classification Search
CPC ........... H04W 72/0446; H04W 72/042; H04W 72/0453; H04W 72/1289; H04L 5/0053; H04L 5/0094
(Continued)

(56) References Cited

U.S. PATENT DOCUMENTS

2016/0302174 A1    10/2016 Chatterjee et al.
2019/0289513 A1*    9/2019 Jeon .................. H04W 72/0453

FOREIGN PATENT DOCUMENTS

| CN | 101296503 A | 10/2008 |
| CN | 104391812 A | 3/2015 |
| WO | 2017026851 A1 | 2/2017 |

OTHER PUBLICATIONS

Huawei et al: "On bandwidth adaptation", 3GPP Draft, R1-1711424, Jun. 26, 2017 (Jun. 26, 2017), 6 pages.
(Continued)

*Primary Examiner* — Peter G Solinsky
(74) *Attorney, Agent, or Firm* — Slater Matsil, LLP

(57) ABSTRACT

A frequency domain resource adjustment and apparatus, and an indication information sending method and apparatus, and a system relate to the field of communications technologies. The method includes: determining, by a network device, to adjust a frequency domain resource of a terminal device from a first frequency domain resource to a second frequency domain resource; sending information about a guard time to the terminal device; determining, by the terminal device, the guard time based on the information about the guard time; and adjusting, by the terminal device, the first frequency domain resource to the second frequency domain resource within the guard time.

20 Claims, 7 Drawing Sheets

(52) U.S. Cl.
CPC ..... *H04W 72/042* (2013.01); *H04W 72/0453* (2013.01); *H04W 72/1289* (2013.01)

(58) Field of Classification Search
USPC .......................................................... 370/329
See application file for complete search history.

(56) References Cited

OTHER PUBLICATIONS

Huawei et al: "Contents of group-common PDCCH", 3GPP Draft; R1-1709953, Jun. 26, 2017 (Jun. 26, 2017), 4 pages.
Huawei et al: "on bandwidth part and bandwidth adaptation", 3GPP Draft; R1-1706900, May 6, 2017 (May 6, 2017), 10 pages.

* cited by examiner

FREQUENCY DOMAIN RESOURCE ADJUSTMENT METHOD AND APPARATUS, INDICATION INFORMATION SENDING METHOD AND APPARATUS, AND SYSTEM

CROSS-REFERENCE TO RELATED APPLICATIONS

This application is a continuation of International Application No. PCT/CN2018/097085, filed on Jul. 25, 2018, which claims priority to Chinese Patent Application No. 201710687298.1, filed on Aug. 11, 2017. The disclosures of the aforementioned applications are hereby incorporated by reference in their entireties.

TECHNICAL FIELD

Embodiments of this application relate to the field of communications technologies, and in particular, to a frequency domain resource adjustment method and apparatus, an indication information sending method and apparatus, and a system.

BACKGROUND

A system service volume significantly increases with an increased service volume of user equipment (UE) and an increased quantity of UEs. Therefore, a design of large system bandwidth is proposed in a next generation wireless communications (next radio, NR) system, and maximum system bandwidth may be 400 megahertz (MHz). In the design of large system bandwidth, more system resources can be provided, and therefore a higher data transmission rate can be provided. Larger bandwidth supported by the UE indicates a higher processing capability of the UE, and may indicate a higher data transmission rate of the UE and higher design costs of the UE. In consideration of the design costs of the UE and the service volume of the UE, bandwidth supported by the UE is usually designed as 20 MHz, 50 MHz, 100 MHz, or the like. Therefore, in the NR system, the bandwidth supported by the UE may be less than the system bandwidth. In this case, a base station configures a bandwidth part (bandwidth part, BWP) for the UE from a system frequency resource, and bandwidth of the bandwidth part is less than or equal to the bandwidth supported by the UE. When the UE and the base station communicate with each other, the base station may allocate, to the UE, some or all resources in the BWP configured for the UE, for use in communication between the base station and the UE.

If the base station configures a plurality of BWPs for the UE, the base station instructs, based on a scheduling requirement, the UE to communicate on different BWPs. In this case, a BWP adjustment is introduced. For the UE, the BWP adjustment may cause radio frequency retuning, and the radio frequency retuning requires a guard time. To avoid a communication error, the base station and the UE need to have a consistent understanding of the guard time. In enhanced machine type communication (eMTC) in long term evolution (LTE), a symbol position and a length of a guard time are predefined to implement frequency hopping between different narrowbands (six RBs) for the UE. However, in eMTC, the guard time exists only on a boundary of a subframe. For the NR system, time required for the BWP adjustment is strongly correlated to frequency domain positions before and after the adjustment, and different BWPs may have different subcarrier spacings. Therefore, when the manner of predefining a guard time in eMTC is used in the NR system, system implementation complexity is increased.

SUMMARY

In view of this, embodiments of this application provide a frequency domain resource adjustment method and apparatus, an indication information sending method and apparatus, and a system, to flexibly indicate a guard time to a terminal device and reduce system implementation complexity.

According to a first aspect, an embodiment of this application provides an indication information sending and frequency domain resource adjustment method, including: determining, by a network device, to adjust a frequency domain resource of a terminal device from a first frequency domain resource to a second frequency domain resource; sending information about a guard time to the terminal device, where the guard time is used for the terminal device to adjust the first frequency domain resource to the second frequency domain resource; after receiving the information about the guard time that is sent by the network device, determining, by the terminal device, the guard time based on the information about the guard time; and then adjusting the first frequency domain resource to the second frequency domain resource within the determined guard time.

In this embodiment of this application, the information about the guard time is introduced, so that the network device can flexibly indicate the guard time to the terminal device in different cases, thereby reducing system implementation complexity.

To avoid a communication error within the guard time, based on the first aspect, in a possible design, the terminal device stops receiving or sending data within the guard time. Specifically, the terminal device stops receiving, within the guard time, data sent by a base station, or the terminal device stops sending, within the guard time, data to a base station.

Based on the first aspect, in a possible design, the network device sends the information about the guard time to the terminal device by using downlink control information (DCI).

Specifically, the network device sends the DCI to the terminal device, where the DCI includes the information about the guard time, and the terminal device receives the information about the guard time by receiving the DCI sent by the network device.

To enable the terminal device to determine a frequency domain resource to which the terminal device adjust a frequency domain resource, based on the first aspect, in a possible design, after determining to adjust the frequency domain resource of terminal device from the first frequency domain resource to the second frequency domain resource, the network device sends indication information to the terminal device, where the indication information is used to instruct the terminal device to adjust a frequency domain resource to the second frequency domain resource; and after receiving the indication information, the terminal device adjust the first frequency domain resource to the second frequency domain resource within the guard time based on the indication information.

Based on the first aspect, in a possible design, the network device sends first configuration information to the terminal device, where the first configuration information includes at least one frequency domain resource adjustment combination. To reduce signaling overheads of the indication information, the indication information indicates one frequency domain resource adjustment combination in the first configuration information; and after receiving the first configuration information sent by the network device, the terminal device can determine, based on the indication information in the at least one frequency domain resource adjustment combination included in the first configuration information, a frequency domain resource to which the terminal device needs to adjust a frequency domain resource.

Based on the first aspect, in a possible design, the first configuration information further includes a length of a guard time respectively corresponding to each of the at least one frequency domain resource adjustment combination.

The foregoing technical solution helps reduce signaling overheads of the information about the guard time.

Based on the first aspect, in a possible design, the information about the guard time includes position information of the guard time.

Based on the first aspect, in a possible design, the information about the guard time includes position information of the guard time and length information of the guard time.

Based on the first aspect, in a possible design, the network device sends second configuration information to the terminal device, and the second configuration information includes at least one guard time position. To reduce signaling overheads of the information about the guard time, the information about the guard time indicates one guard time position in the second configuration information; and after receiving the second configuration information, the terminal device can determine, in the at least one guard time position based on the information about the guard time, the guard time position indicated by the information about the guard time.

Based on the first aspect, in a possible design, the terminal device may obtain a length of the guard time in the following manner: The network device sends length information of the guard time to the terminal device, where the length information of the guard time is used to indicate one of M guard time lengths, the M guard time lengths are sent by the network device to the terminal device by using third configuration information, and M is a positive integer greater than or equal to 1; and after receiving the length information of the guard time, the terminal device can obtain the length of the guard time.

Based on the first aspect, in a possible design, the information about the guard time is used to indicate a scheduling time unit in which a start position of the guard time is located, the start position of the guard time is a start position of a next symbol of a specific symbol in the scheduling time unit, and the specific symbol is a symbol for scheduling the downlink control information; or the information about the guard time is used to indicate a scheduling time unit in which an end position of the guard time is located, and the end position of the guard time is a start position of the scheduling time unit.

According to a second aspect, this application provides an indication information sending apparatus, including units or means configured to perform steps performed by the network device in the first aspect.

According to a third aspect, this application provides an indication information sending apparatus, including at least one processing element and at least one storage element. The at least one storage element is configured to store a program and data. The at least one processing element is configured to perform the action or the function of the network device in the first aspect of this application.

According to a fourth aspect, this application provides an indication information sending apparatus, including at least one processing element (or chip) configured to perform the action or the function of the network device in the first aspect.

According to a fifth aspect, this application provides an indication information sending program, and when being executed by a processor, the program is used to perform the action or the function of the network device in the first aspect.

According to a sixth aspect, a program product such as a computer readable storage medium is provided, including the program in the fifth aspect.

According to a seventh aspect, this application provides a frequency domain resource adjustment apparatus, including units or means configured to perform steps performed by the terminal device in the first aspect.

According to an eighth aspect, this application provides a frequency domain resource adjustment apparatus, including at least one processing element and at least one storage element. The at least one storage element is configured to store a program and data. The at least one processing element is configured to perform the action or the function of the terminal device in the first aspect of this application.

According to a ninth aspect, this application provides a frequency domain resource adjustment apparatus, including at least one processing element (or chip) configured to perform the action or the function of the terminal device in the first aspect.

According to a tenth aspect, this application provides a frequency domain resource adjustment program, and when being executed by a processor, the program is used to perform the action or the function of the terminal device in the first aspect.

According to an eleventh aspect, a program product such as a computer readable storage medium is provided, including the program in the tenth aspect.

According to a twelfth aspect, an embodiment of this application provides a communications system, including the frequency domain resource adjustment apparatus provided in the seventh aspect and the indication information sending apparatus provided in the second aspect.

DETAILED DESCRIPTION OF ILLUSTRATIVE EMBODIMENTS

The following describes the embodiments of this application in detail with reference to the accompanying drawings in this specification.

In a wireless communications system, a base station and a terminal device may wirelessly communicate with each other by using an air interface resource. In a possible wireless communications system such as a 5th generation (5th-Generation, 5G) mobile communications technology system, the air interface resource includes a frequency resource. The frequency resource may be within a specified frequency range. The frequency range may also be referred to as a band or a frequency band. In frequency domain, a center of the frequency resource may be referred to as a center frequency, and a width of the frequency resource may be referred to as bandwidth (BW for short).

When the base station and the terminal device wirelessly communicate with each other by using the frequency resource, the base station manages a system frequency resource, and allocates a frequency resource to the terminal device from the system frequency resource, so that the base station and the terminal device can communicate by using the allocated frequency resource. The system frequency resource may be described as a frequency resource that may be managed and allocated by the base station, or may be described as a frequency resource that may be used for communication between the base station and the terminal device. In the embodiments of this application, the system frequency resource may also be referred to as a system resource or a transmission resource. In frequency domain, a width of the system frequency resource may be referred to as bandwidth of the system frequency resource, or may be referred to as system bandwidth, transmission bandwidth, or carrier bandwidth.

Figure 1A:
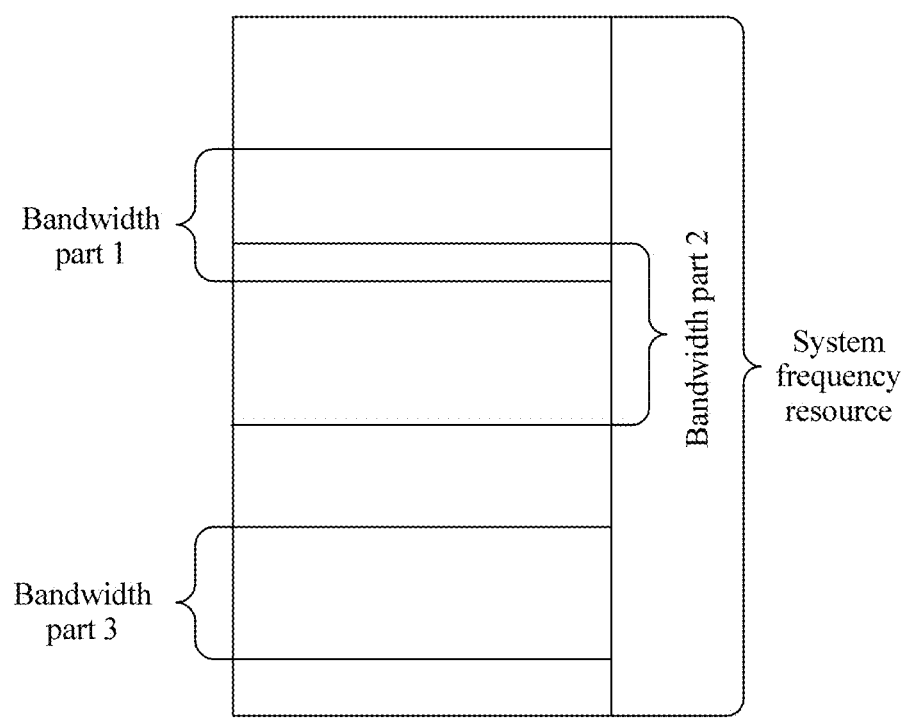
FIG. 1a is a schematic diagram of a system frequency resource according to an embodiment of this application.

A possible design in which the base station allocates the frequency resource to the terminal device is as follows: The base station configures a bandwidth resource for the terminal device from the system frequency resource, so that the base station can allocate some or all resources in the bandwidth resource to the terminal device. The resources are used for communication between the base station and the terminal device. The bandwidth resource is included in the system frequency resource, and may be some consecutive or inconsecutive resources in the system frequency resource, or may be all resources in the system frequency resource. The bandwidth resource may also be referred to as a bandwidth part (BWP), a carrier bandwidth part, a frequency resource part, a part of a frequency resource, or another name. This is not limited in the embodiments of this application. When the bandwidth resource is a segment of consecutive resources in the system frequency resource, the bandwidth resource may also be referred to as a subband, a narrowband, or another name. This is not limited in the embodiments of this application. For example, FIG. 1a is a possible schematic structural diagram of a bandwidth part included in a system frequency resource. The system frequency resource includes three bandwidth resources: a bandwidth part 1, a bandwidth part 2, and a bandwidth part 3.

In actual application, the system frequency resource may include any integer quantity of bandwidth resources. This is not limited in the embodiments of this application. Different bandwidth resources are bandwidth resources that are not exactly the same. A bandwidth resource A and a bandwidth resource B are used as an example. That the bandwidth resource A and the bandwidth resource B are not exactly the same may be further described as follows: Some or all frequency resources included in the bandwidth resource A are not included in the bandwidth resource B, or some or all frequency resources included in the bandwidth resource B are not included in the bandwidth resource A. For example, in a communications system based on an orthogonal frequency division multiplexing (OFDM) technology, that a bandwidth resource A and a bandwidth resource B are not exactly the same may mean that at least one subcarrier included in the bandwidth resource A is not included in the bandwidth resource B, or at least one subcarrier included in the bandwidth resource B is not included in the bandwidth resource A.

For example, the possible design in which the base station allocates the frequency resource to the terminal device may be applied to the following three scenarios:

Scenario 1: Large-Bandwidth Scenario

A system service volume significantly increases with an increased service volume of a terminal device and an increased quantity of terminal devices. Therefore, a design of large system bandwidth is proposed. Maximum system bandwidth in an NR system may be 400 MHz. In this case, more system resources can be provided, and therefore a higher data transmission rate can be provided. Larger bandwidth supported by the terminal device indicates a higher processing capability of the terminal device, and may indicate a higher data transmission rate of the terminal device and higher design costs of the terminal device. In consideration of the design costs of the terminal device and the service volume of the terminal device, bandwidth supported by the terminal device may be usually designed as 20 MHz, 50 MHz, 10 MHz, or the like. Therefore, in a communications system with large system bandwidth, bandwidth supported by a terminal device may be less than the system bandwidth. The bandwidth supported by the UE may also be referred to as a bandwidth capability of the terminal device. In addition, different terminal devices may have a same bandwidth capability, or may have different bandwidth capabilities. This is not limited in the embodiments of this application.

In the communications system with the large system bandwidth, because the bandwidth capability of the terminal device is less than the system bandwidth, a base station may configure a bandwidth resource for the terminal device from a system frequency resource. Bandwidth of the bandwidth resource is less than or equal to the bandwidth capability of the terminal device. When the terminal device and the base station communicate with each other, the base station may allocate some or all resources in the bandwidth resource configured for the terminal device to the terminal device, for use in communication between the base station and the terminal device.

Scenario 2: Multi-Parameter Scenario

In a wireless communications system such as a 5G system, to support more service types and/or communications scenarios, a design of supporting multiple parameters is proposed. Parameters may be separately set for different service types and/or communications scenarios. The parameter includes at least one of a subcarrier spacing and a cyclic prefix (CP). In a process in which a 3rd generation partnership project (3GPP) studies and formulates a standard of the wireless communications system, the parameter may also be referred to as a numerology.

In a possible configuration, a base station may configure a plurality of bandwidth resources in a system frequency resource, and configure a numerology for each of the plurality of bandwidth resources, to support a plurality of service types and/or communications scenarios in the system frequency resource. Different bandwidth resources may have a same numerology, or may have different numerologies. This is not limited in this application.

When the base station and a terminal device communicate with each other, the base station may determine, based on a service type and/or a communications scenario corresponding to the communication, a numerology A used for communication, so that a corresponding bandwidth resource may be configured for the terminal device. A numerology of the corresponding bandwidth resource is configured as the numerology A. When the terminal device and the base station communicate with each other, the base station may allocate some or all resources in the bandwidth resource configured for the terminal device to the terminal device. The resources are used for communication between the base station and the terminal device.

Scenario 3: Bandwidth Fallback

When a base station and a terminal device communicate with each other, the base station may configure a bandwidth resource for the terminal device based on a service volume of the terminal device, to reduce power consumption of the terminal device. For example, if the terminal device has a relatively small service volume, the base station may configure a bandwidth resource with a relatively smaller bandwidth for the terminal device, so that a radio frequency processing and baseband processing task volume of the terminal device can be reduced, thereby reducing the power consumption of the terminal device. If the terminal device has a relatively large service volume, the base station may configure a bandwidth resource with a relatively larger bandwidth for the terminal device, so that a higher data transmission rate can be provided. When the terminal device and the base station communicate with each other, the base station may allocate some or all resources in the bandwidth resource configured for the terminal device to the terminal device. The resources are used for communication between the base station and the terminal device.

In the foregoing scenarios, there is a bandwidth part adjustment.

In scenario 1, when the base station allocates a resource to the terminal device, the base station may perform a bandwidth part adjustment based on a channel condition and a load status, so that data is scheduled to a better channel for transmission. In addition, if a current bandwidth part is overloaded, data is scheduled to another bandwidth part, so that load balancing is implemented.

In scenario 2, if the terminal device supports only one numerology at a time, to support different service types, an adjustment needs to be made between different bandwidth parts.

In scenario 3, to fall back from a larger bandwidth to a small bandwidth, the terminal device falls back from a large BWP to a small BWP.

When a BWP adjustment is performed, a terminal device may need to perform radio frequency retuning. It takes time to perform radio frequency retuning. According to a result given in 3GPP RAN4, at least for a frequency band below 6 GHz, if a BWP before an adjustment and a BWP after the adjustment belong to a same band and have a same center frequency, a radio frequency retuning time may reach 20 microseconds (μs); or if a BWP before an adjustment and a BWP after the adjustment belong to a same band and have different center frequencies, a radio frequency retuning time ranges from 50 μs to 200 μs; or if a BWP before an adjustment and a BWP after the adjustment belong to different bands, a radio frequency retuning time may reach 900 μs. When the radio frequency retuning time is represented in a unit of a symbol, the radio frequency retuning time may be shown in Table 1.

TABLE 1

| | Radio frequency retuning time (unit: symbol) | | |
|---|---|---|---|
| Subcarrier spacing (unit: kHz) | Same band and same center frequency | Same band and different center frequencies | Different bands |
| 15 | 1 | 1-4 | ≤14 |
| 30 | 1 | 2-7 | ≤27 |
| 60 | ≤2 | 3-12 | ≤54 |

Figure 1B:
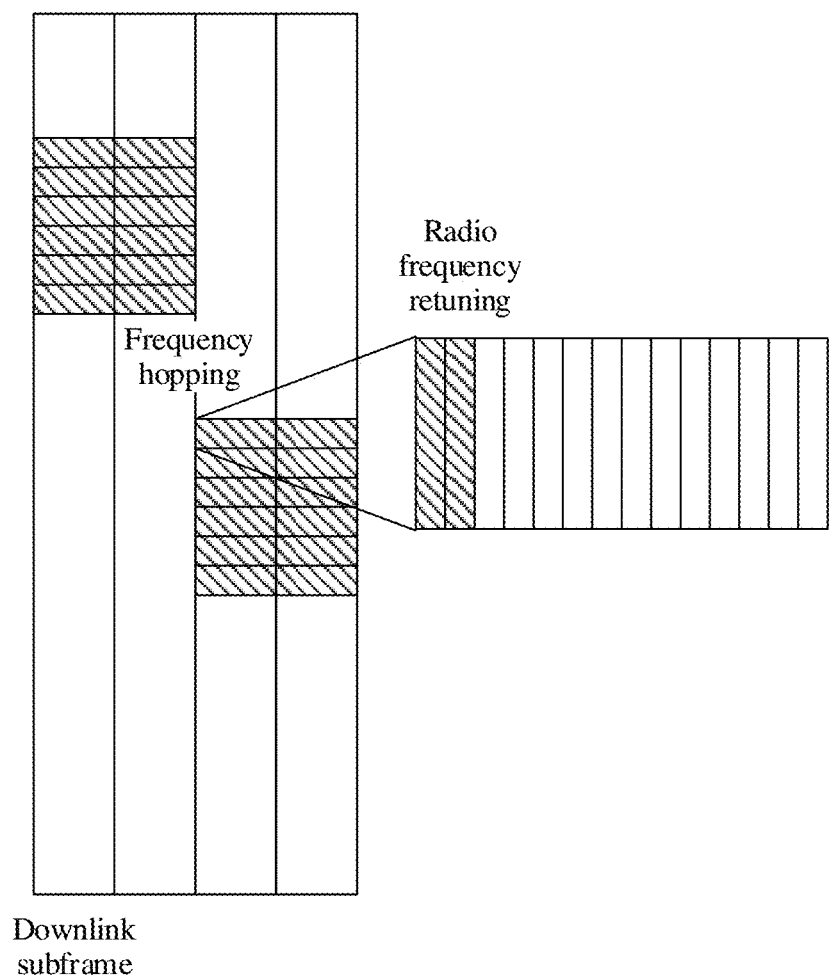
FIG. 1b is a schematic diagram of radio frequency retuning in LTE.

In eMTC in LTE, in consideration of a limited radio frequency capability of a user equipment, maximum bandwidth of the user equipment is 1.08 MHz, which corresponds to six resource blocks (RBs) in the LTE. A frequency domain diversity gain may be obtained by performing frequency hopping in different frequency domains. During frequency hopping, two symbols need to be used as a guard time of radio frequency retuning of a terminal device, as shown in FIG. 1b. A symbol position of a guard time is predefined in an LTE protocol.

For an uplink (UL), if both a subframe before frequency hopping and a subframe after the frequency hopping are used to transmit data on a physical uplink control channel (physical uplink control channel, PUCCH), or both a subframe before frequency hopping and a subframe after the frequency hopping are used to transmit data on a physical uplink shared channel (PUSCH), a guard time occupies the last symbol of the former subframe and the first symbol of the latter subframe, and a terminal device does not send data on the two symbols. If a subframe before frequency hopping is used to transmit data on a PUCCH, and a subframe after the frequency hopping is used to transmit data on a PUSCH, the first or second symbol of the PUSCH is a guard time, and a terminal device does not send data on the first or second symbol of the PUSCH (based on whether a truncation mode is used for the PUCCH). If a subframe before frequency hopping is used to transmit data on a PUSCH, and a subframe after the frequency hopping is used to transmit data on the PUCCH, last two symbols of the PUSCH are a guard time, and a terminal device does not send data on the last two symbols of the PUSCH. For a downlink (DL), when a frequency domain resource before frequency hopping and a frequency domain resource after the frequency hopping have different center frequencies, a maximum of first two symbols in a subframe after the frequency hopping are used as a guard time, and a terminal device does not receive data on the two symbols.

Based on the foregoing predefined symbol positions, a terminal device determines a symbol position of a guard time based on a corresponding scheduled channel type, and then performs radio frequency retuning at the corresponding symbol position, and does not receive or send data.

However, in an NR system, a BWP adjustment requires different radio frequency retuning times in different cases in consideration of a bandwidth capability of a terminal device. Further, the BWP adjustment is not limited to a boundary of a subframe, and may be alternatively performed on an interior of the subframe. In addition, there are more slot types in the NR system, and therefore more channel types need to be considered.

In consideration of these factors, if the manner, in the LTE, in which a symbol position of a guard time is defined based on a channel type is still used, a protocol is very complex, and system implementation complexity is increased.

To resolve the foregoing technical problem, the embodiments of this application provide a frequency domain resource adjustment method and an indication information sending method. In the embodiments of this application, information about a guard time is introduced, so that a network device can flexibly indicate a guard time to a terminal device in different cases, thereby helping the terminal device successfully complete a frequency domain resource adjustment.

The following describes some terms in the embodiments of this application, to facilitate understanding by persons skilled in the art.

1. A terminal device is also referred to as user equipment (UE), a mobile station (MS), a mobile terminal (MT), or the like, and is a device that provides a user with voice and/or data connectivity, for example, a handheld device or an in-vehicle device having a wireless connection function. Currently, the terminal device is, for example, a mobile phone, a tablet computer, a notebook computer, a palmtop computer, a mobile internet device (MID), a wearable device, a virtual reality (VR) device, an augmented reality (AR) device, an industrial control wireless terminal, a self-driving wireless terminal, a wireless terminal in a remote medical surgery, a wireless terminal in a smart grid, a wireless terminal in transportation safety, a wireless terminal in a smart city, or a wireless terminal in a smart home.

2. A network device is a device in a wireless network, for example, a radio access network (RAN) node (or device) that connects a terminal device to the wireless network. Currently, the RAN node is, for example, a gNB, a transmission reception point (TRP), an evolved NodeB (evolved Node B, or eNB), a radio network controller (RNC), a NodeB (Node B, or NB), a base station controller (BSC), a base transceiving station (BTS), a home base station (for example, a home evolved NodeB or a home Node B, HNB), a baseband unit (BBU), or a wireless fidelity (WiFi) access point (AP). In addition, in a network structure, the RAN may include a central unit (CU) node and a distributed unit (DU) node. In this structure, protocol layers of an eNB in a long term evolution (LTE) system are split. Functions of some protocol layers are controlled by the CU in a centralized manner, some or all functions of the remaining protocol layers are distributed in the DU, and the CU controls the DU in a centralized manner.

3. "A plurality of" indicates two or more, and other measure words are similar to this. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

4. A frequency domain resource is a physical resource used for communication in frequency domain. For example, the frequency domain resource may be a BWP, a resource block, a subband, or a narrowband. The frequency domain resource may also be referred to as a bandwidth resource, a bandwidth part, a frequency resource part, a part of a frequency resource, or another name. When the bandwidth resource is a segment of consecutive resources in a system frequency resource, the bandwidth resource may also be referred to as a subband, a narrowband, or another name. This is not limited in this application. The BWP refers to some frequency domain resources in carrier bandwidth allocated by a network device to a terminal device. A size of the BWP is less than or equal to a bandwidth capability of the terminal device. In other words, the size of the BWP is less than or equal to bandwidth supported by the terminal device. In addition, the BWP may be consecutive frequency domain resources. For example, the BWP may include a plurality of consecutive subcarriers. For another example, the BWP may include a plurality of consecutive PRBs. The consecutive frequency domain resources help reduce resource allocation complexity. The terminal device may support a plurality of BWPs. In other words, the network device may configure a plurality of BWPs for the terminal device. When the network device configures a plurality of BWPs for the terminal device, the plurality of BWPs may overlap, or may not overlap. In addition, frequency domain resources included in different BWPs may have a same subcarrier spacing, or may have different subcarrier spacings. The subcarrier spacing is a frequency domain length of a resource element (resource element, RE). A value of the subcarrier spacing may be 15 kHz, 30 kHz, 60 kHz, or the like.

5. A guard time is used by a terminal device to perform a frequency domain resource adjustment. In addition, the guard time may further include a baseband processing time, an automatic gain control (AGC) adjustment time, and the like. In addition, in the embodiments of this application, the guard time may also be referred to as a guard period, a switching time (or switching period), a switching interval, a retuning time (retune time), a retuning period (retune period), or the like. This is not limited in the embodiments of this application.

6. Information about a guard time refers to information used to indicate a parameter of the guard time in time domain, for example, a start position of the guard time, a length of the guard time, or other parameter information related to the guard time.

7. A scheduling time unit refers to a unit or a granularity for scheduling a resource in time domain. For example, the scheduling time unit may be a subframe, a slot, or a mini-slot. In LTE, the scheduling time unit may alternatively be a transmission time interval (TTI). In addition, the scheduling time unit may include one or more time resource units. The time resource unit is a resource unit in time domain. A quantity of time resource units in the scheduling time unit is a quantity of time resource units that are scheduled at a time in time domain. For example, when the scheduling time unit is a subframe, the time resource unit may be an orthogonal frequency division multiplexing (OFDM) symbol, and the quantity of time resource units in the scheduling time unit is a quantity of OFDM symbols in the subframe that are scheduled at a time; or when the scheduling time unit is a slot, the time resource unit may be an OFDM symbol, and the quantity of time resource units in the scheduling time unit is a quantity of OFDM symbols in the slot that are scheduled at a time.

Figure 2:
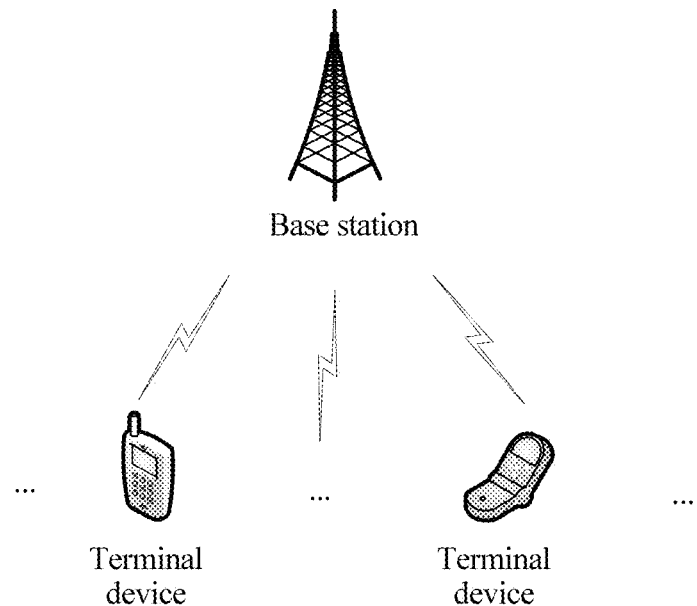
FIG. 2 is a schematic architectural diagram of a communications system to which the embodiments of this application are applied.

It should be understood that the embodiments of this application may be applied to but not limited to an NR system, and may be further applied to a communications system such as an LTE system, a long term evolution-advanced (LTE-A) system, or an enhanced long term evolution (eLTE) system, or may be extended to a related cellular system such as wireless fidelity (WiFi), worldwide interoperability for microwave access (WiMAX), or a 3rd generation partnership project (3GPP). Specifically, an architecture of a communications system to which the embodiments of this application are applied may be shown in FIG. 2, including a base station and at least one terminal device. It should be noted that a quantity of terminal devices in the communications system shown in FIG. 2 is not limited in the embodiments of this application.

The following describes the indication information sending method and the frequency domain resource adjustment method in the embodiments of this application in detail by using an example in which a network device is a base station. When the network device is another device, the indication information sending method and the frequency domain resource adjustment method are similar to those used when the network device is a base station. Details are not described herein again.

Figure 3:
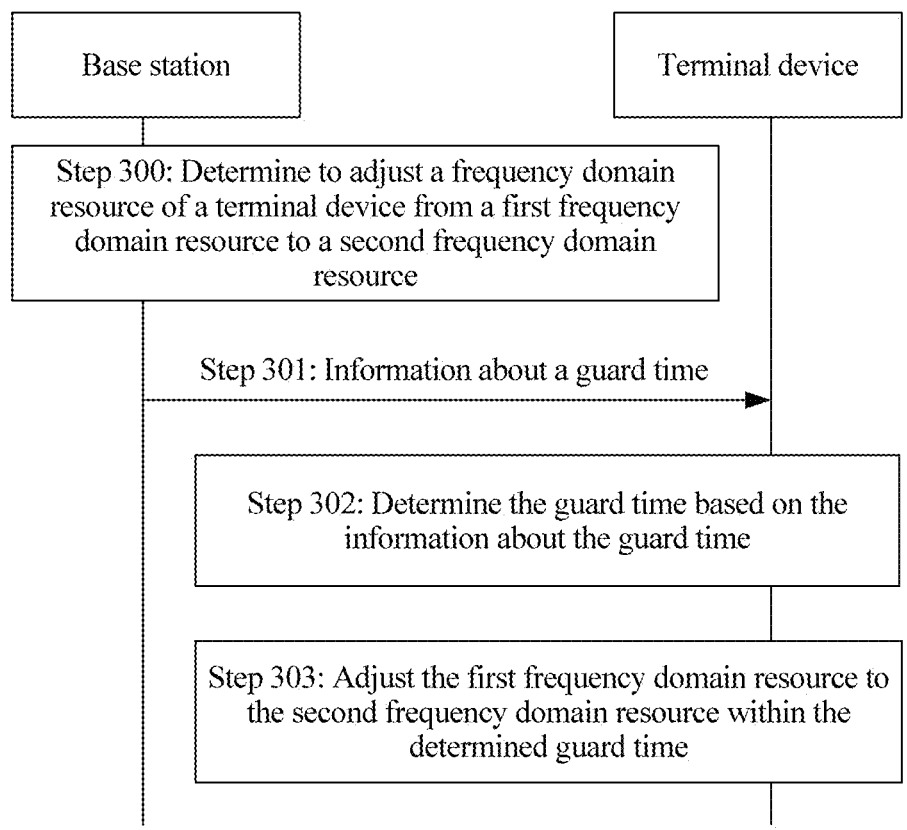
FIG. 3 is a schematic flowchart of an indication information sending and frequency domain resource adjustment method according to an embodiment of this application.

As shown in FIG. 3, an indication information sending method and a frequency domain resource adjustment method according to an embodiment of this application include the following steps.

Step 300: A base station determines to adjust a frequency domain resource of a terminal device from a first frequency domain resource to a second frequency domain resource.

Step 301: The base station sends information about a guard time to the terminal device, where the guard time is used for the terminal device to adjust the first frequency domain resource to the second frequency domain resource.

Step 302: After receiving the information about the guard time that is sent by the base station, the terminal device determines the guard time based on the information about the guard time.

Step 303: The terminal device adjust the first frequency domain resource to the second frequency domain resource within the determined guard time.

If the base station and the terminal device continue to communicate with each other in a process of adjustment from the first frequency domain resource to the second frequency domain resource, because a radio frequency of the terminal device is being adjusted, data cannot be sent or received. Consequently, a packet may be lost, and a communication error is caused. In this embodiment of this application, to avoid an error in communication between the base station and the terminal device in the process of adjustment from the first frequency domain resource to the second frequency domain resource, optionally, the terminal device stops receiving or sending data within the guard time.

In this embodiment of this application, the base station may send the information about the guard time to the terminal device by using downlink control information (DCI), where the DCI includes the information about the guard time. Alternatively, in this embodiment of this application, the information about the guard time may be sent by using radio resource control (RRC) signaling, a broadcast message, a system message, or signaling carried in a medium access control (MAC) control element (CE) or a physical downlink data channel. This is not limited in this embodiment of this application.

In this embodiment of this application, before step 303, the base station may further indicate, by sending indication information to the terminal device, the second frequency domain resource to which the terminal device adjusts a frequency domain resource. For example, the indication information may be identification information of the second frequency domain resource, for example, an index number of the second frequency domain resource. It should be noted that the base station may send the indication information and the information about the guard time to the terminal device by using same DCI. The DCI includes the indication information and the information about the guard time. Alternatively, the base station may separately send the indication information and the information about the guard time to the terminal device by using two different pieces of DCI, where one piece of DCI includes the indication information, and the other piece of DCI includes the information about the guard time. It should be noted that the DCI including the information about the guard time, the DCI including the indication information, and DCI including scheduling information may be the same DCI, or may be different DCI.

In a possible implementation, the information about the guard time and the indication information are included in same DCI, and the DCI is referred to as first DCI. The DCI including the scheduling information is second DCI. The first DCI may be UE-level DCI, and the DCI includes two fields.

A first field indicates the index number of the second frequency domain resource. The indication may be in a form of a bitmap. In the bitmap, a bit 0 corresponds to a frequency domain resource 0, a bit 1 corresponds to a frequency domain resource 1, . . . , and a bit M−1 corresponds to a frequency domain resource M−1, where M is a quantity of frequency domain resources configured by the base station for the UE. In a possible example, when a value of a specific bit in the bitmap is 0, a corresponding frequency domain resource is deactivated; or when a value of a specific bit in the bitmap is 1, a corresponding frequency domain resource is activated. A beneficial effect of this solution is that a plurality of frequency domain resources can be simultaneously activated/deactivated. In addition, the indication may be a specific indication field. A length of the field is $\lceil \log_2(M) \rceil$. For example, when M=4, two bits are used for indication. In a possible manner, 00 corresponds to the frequency domain resource 0, 01 corresponds to the frequency domain resource 1, 10 corresponds to the frequency domain resource 2, and 11 corresponds to the frequency domain resource 3.

A second field is used to indicate the information about the guard time. In this embodiment of this application, quantities of bits occupied by indication content are different in different methods. To reduce overheads of a signaling indication in the DCI, some predefined information may be indicated by using RRC signaling. The DCI is used to indicate an option in the RRC signaling.

In another possible implementation, the information about the guard time, the indication information, and resource allocation information are included in one piece of DCI. The DCI includes at least three fields.

A first field indicates the index number of the second frequency domain resource. The indication may be in a form of a bitmap. In the bitmap, a bit 0 corresponds to a frequency domain resource 0, a bit 1 corresponds to a frequency domain resource 1, . . . , and a bit M−1 corresponds to a frequency domain resource M−1, where M is a quantity of frequency domain resources configured by the base station for the terminal device. In a possible example, when a value of a specific bit in the bitmap is 0, a corresponding frequency domain resource is deactivated; or when a value of a specific bit in the bitmap is 1, a corresponding frequency domain resource is activated. A beneficial effect of this solution is that a plurality of frequency domain resources can be simultaneously activated/deactivated. In addition, the indication may be a specific indication field. A length of the field is $\lceil \log_2(M) \rceil$. For example, when M=4, two bits are used for indication. In a possible manner, 00 corresponds to the frequency domain resource 0, 01 corresponds to the frequency domain resource 1, 10 corresponds to the frequency domain resource 2, and 11 corresponds to the frequency domain resource 3.

A second field is used to indicate the information about the guard time. In this embodiment of this application, quantities of bits occupied by indication content are different in different methods. To reduce overheads of a signaling indication in the DCI, some predefined information may be indicated by using RRC signaling. The DCI is used to indicate an option in the RRC signaling.

A third field is used to indicate the resource allocation information.

To reduce signaling overheads of the indication information, optionally, the base station sends first configuration information to the terminal device. The first configuration information includes at least one frequency domain resource adjustment combination. Alternatively, the at least one frequency domain resource adjustment combination is predefined. In this case, the indication information may be used to indicate one frequency domain resource adjustment combination in the at least one frequency domain resource adjustment combination. For example, if the base station determines to adjust the frequency domain resource of the terminal device from the first frequency domain resource to the second frequency domain resource, the indication information indicates an adjustment combination of the first frequency domain resource and the second frequency domain resource.

For example, a frequency domain resource is a BWP. It is assumed that frequency domain resource adjustment combinations are {BWP 0, BWP 1}, {BWP 0, BWP 3}, and {BWP 1, and BWP 2}. If the first BWP in { } is a BWP before an adjustment, the second BWP in { } is a BWP after the adjustment. When the BWP 0 is a BWP before an adjustment, there are only two possible BWPs after the adjustment: the BWP 1 and the BWP 3. Therefore, when a BWP before an adjustment is the BWP 0, only 1-bit (bit) information is required to indicate a BWP to which the terminal device adjusts the BWP 0. It is assumed that {BWP 0, BWP 1} corresponds to a bit with a value 1, and {BWP 0, BWP 3} corresponds to a bit with a value 0. If the terminal device needs to adjust the BWP 0 to the BWP 3, the base station sends the bit with the value 0 to the terminal device, so that the terminal device can determine the BWP to which the terminal device adjusts the BWP 0.

Figure 4A:
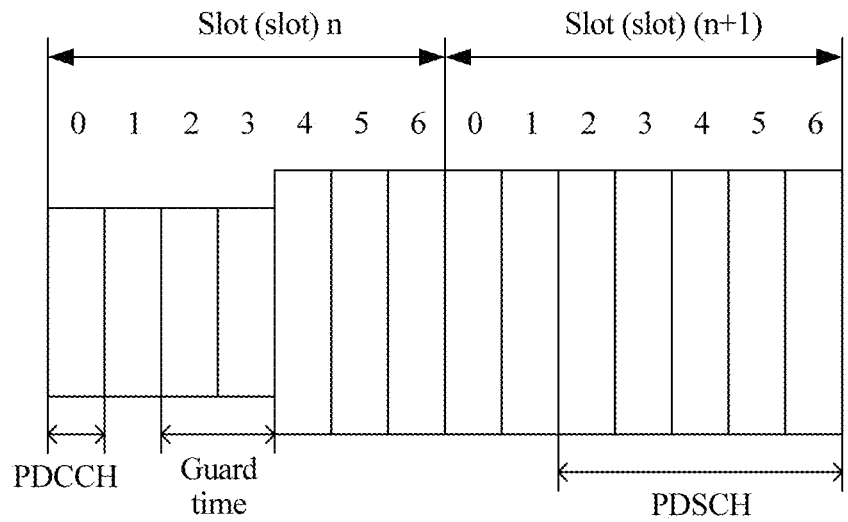
FIG. 4a and FIG. 4b are schematic diagrams of a guard time according to an embodiment of this application.

In this embodiment of this application, a possible implementation of the information about the guard time is as follows: The information about the guard time includes position information of the guard time. Specifically, the information about the guard time includes start position information of the guard time and end position information of the guard time. The start position information may be used to indicate a start symbol of the guard time, may be used to indicate a start position of a start symbol of the guard time, or the like. The end position information may be used to indicate an end symbol of the guard time, may be used to indicate an end position of an end symbol of the guard time, or the like. Specifically, the position information may be a position index, may be an identifier of a time unit, or the like. The time unit may include a subframe, a frame, a slot, a mini-slot, a symbol, or the like. Alternatively, the position information may be a $k^{th}$ time unit after a time unit in which the terminal device detects control information, or may be k time units before a time unit in which hybrid automatic repeat request (HARQ) information is scheduled. As shown in FIG. 4a, a PDCCH is sent on a symbol 0 in a slot n. The PDCCH indicates the information about the guard time, including a start position of the guard time and an end position of the guard time. If a symbol on which the control information is located is used as a reference point, the start position is a second symbol after the symbol 0, and the end position is a third symbol after the symbol 0. Therefore, k1=2, k2=3, and in the DCI, a corresponding start position field indicates 2, and an end position field indicates 3. If a start symbol of a PDSCH scheduled by using the PDCCH is used as an indication reference point, it indicates that the start position of the guard time is a seventh symbol before the start symbol of the PDSCH, and the end position is a sixth symbol before the start symbol of the PDSCH. Therefore, k1=7, k2=6, and in the DCI, a corresponding start position field indicates 7, and an end position field indicates 6. It should be noted that selection of the reference point is not limited to the two manners, and the reference point may alternatively be a boundary of a slot, or the like. In this implementation, the guard time is indicated by using the start position and the end position, so that the base station can have highest flexibility, but indication overheads are large.

Another possible implementation of the information about the guard time is as follows: If a length of the guard time is predefined, the information about the guard time may include only start position information of the guard time, or the information about the guard time includes only end position information of the guard time. That a length of the guard time is predefined means that the base station and the terminal device have a consistent understanding of the length of the guard time in a specific manner. The time may be specified, for example, defined in a protocol. As shown in Table 2, corresponding quantities of symbols in retuning times are agreed on for different numerologies. Alternatively, a reference numerology may be predefined. For example, if the reference numerology is 15 kHz, only the first row in Table 2 needs to be defined.

TABLE 2

| Subcarrier spacing (unit: kHz) | Radio frequency retuning time (unit: symbol) | | |
|---|---|---|---|
| | Same band and same center frequency | Same band and different center frequencies | Different bands |
| 15 | 1 | 1 | 3 |
| 30 | 1 | 2 | 4 |
| 60 | 2 | 3 | 8 |

Alternatively, the guard time is based on a time reported by the terminal device. In a possible implementation, an absolute time is reported. The base station and the terminal device need to agree on a method for calculating a guard time in a unit of a symbol in different numerologies.

In a possible implementation, it is assumed that a guard time reported by the terminal device is RT0 microseconds. If a symbol time in a case of a specific numerology is ST microseconds, a corresponding guard time calculation manner is $\lceil RT0/ST \rceil$.

In another possible implementation, it is assumed that a guard time reported by the terminal device is RT0 microseconds. If 15 kHz is used as a reference numerology, and a symbol length corresponding to 15 kHz is ST0, a corresponding guard time is GT0=$\lceil RT0/ST0 \rceil$ symbols in a case of a subcarrier spacing of 15 kHz. For another subcarrier spacing, a guard time is determined by using a ratio of the subcarrier spacing to the reference subcarrier spacing. Specifically, for a subcarrier spacing of 30 kHz, a guard time is 2*GT0 symbols, and for a subcarrier spacing of 60 kHz, a guard time is 4*GT0 symbols.

The guard time is based on the time reported by the terminal device. In another possible implementation, a quantity of symbols is reported, and the base station and the UE use the reported quantity of symbols as the length of the guard time.

In a possible implementation, the terminal device reports a quantity of symbols for each numerology.

In another possible implementation, the quantity of symbols that is reported by the terminal device is based on a specific numerology. For example, 15 kHz is used as a reference numerology, and a guard time corresponding to 15 kHz is GT0 symbols. For another subcarrier spacing, a guard time is determined by using a ratio of the subcarrier spacing to the reference subcarrier spacing. Specifically, for a subcarrier spacing of 30 kHz, a guard time is 2*GT0 symbols, and for a subcarrier spacing of 60 kHz, a guard time is 4*GT0 symbols.

In addition, in this embodiment of this application, the base station may notify the terminal device of the length of the guard time in advance. Optionally, lengths of guard times corresponding to different frequency domain resource adjustment cases are predefined on the base station, or a rule for calculating a length of a guard time is predefined in Table 1. The base station notifies the terminal device of the length of the guard time by using radio resource control (RRC) signaling or other signaling. Therefore, when the terminal device adjusts the first frequency domain resource to the second frequency domain resource, the length of the guard time may be determined.

For example, in this embodiment of this application, the base station notifies the terminal device of the length of the guard time by using the first configuration information. Specifically, when sending the at least one frequency domain resource adjustment combination to the terminal device by using the first configuration information, the base station may further send, to the terminal device by using the first configuration information, a length of a guard time respectively corresponding to the at least one frequency domain resource adjustment combination. A BWP is used as an example. The first configuration information includes {BWP 0, BWP 1, t0} and {BWP 0, BWP 2, t1}. If the terminal device determines to adjust the BWP 0 to the BWP 1, it determines that the length of the guard time is t0. The guard time is in a unit of a symbol. A used subcarrier spacing of the symbol may be a specific default reference subcarrier spacing, and may be the same as a subcarrier spacing of a source BWP, or may be the same as a subcarrier spacing of a destination BWP.

Alternatively, in this embodiment of this application, M guard time lengths may be predefined. The base station sends the M guard time lengths to the terminal device by using third configuration information, and then indicates, to the terminal device by using DCI, a length of the guard time for an adjustment from the first frequency domain resource to the second frequency domain resource. Specifically, the third configuration information is carried in RRC signaling or other signaling. This is not limited in this embodiment of this application.

In this embodiment of this application, still another possible implementation of the information about the guard time is as follows: The information about the guard time includes position information of the guard time and length information of the guard time. For example, the position information of the guard time may be used to indicate a start symbol of the guard time, may be used to indicate a start position of a start symbol of the guard time, may be used to indicate an end symbol of the guard time, may be used to indicate an end position of an end symbol of the guard time, or the like. Specifically, the position information may be a position index, may be a symbol identifier, or may be a relative position to a reference position. For example, start position information of the guard time may be an identifier of the start symbol of the guard time, an index of the start position of the start symbol of the guard time, or the like. Specifically, the position information may be a position index, may be an identifier of a time unit, or the like. The time unit may include a subframe, a frame, a slot, a mini-slot, a symbol, or the like. Alternatively, the position information may be a $k^{th}$ time unit after a time unit in which the terminal device detects control information, or may be k time units before a time unit in which hybrid automatic repeat request (HARQ) information is scheduled. As shown in FIG. 4a, a PDCCH is sent on a symbol 0 in a slot n. The PDCCH indicates the information about the guard time including a start position of the guard time and an end position of the guard time. If a symbol on which the control information is located is used as a reference point, the start position is a second symbol after the symbol 0, and the end position is a third symbol after the symbol 0. Therefore, k1=2, k2=3, and in the DCI, a corresponding start position field indicates 2, and an end position field indicates 3. If a start symbol of a PDSCH scheduled by using the PDCCH is used as an indication reference point, it indicates that a start position of a guard time is a seventh symbol before the start symbol of the PDSCH, and an end position is a sixth symbol before the start symbol of the PDSCH. Therefore, k1=7, k2=6, and in the DCI, a corresponding start position field indicates 7, and an end position field indicates 6. It should be noted that selection of the reference point is not limited to the two manners, and the reference point may alternatively be a boundary of a slot, or the like. In this implementation, the guard time is indicated by using the start position and the end position, so that the base station can have highest flexibility, but indication overheads are large.

To reduce signaling overheads of the position information of the guard time, in this embodiment of this application, at least one guard time position may be predefined on the base station. Specifically, the base station sends second configuration information to the terminal device. The second configuration information includes at least one guard time position. When the base station sends the information about the guard time to the terminal device, a guard time position indicated by using the information about the guard time is a guard time position in the at least one guard time position.

For example, it is assumed that the at least one guard time position is {start symbol 1, start symbol 2, end symbol 1, end symbol 2}. When the information about the guard time includes only one piece of position information of the guard time, if the position information of the guard time is used to indicate the start symbol 1, the start symbol 1 may be indicated by using only 2-bit information. When the information about the guard time includes start position information and end position information of the guard time, if the start position information of the guard time is used to indicate the start symbol 1, and the end position information of the guard time is used to indicate the end symbol 1, the start symbol 1 and the end symbol 1 may be indicated by using only 4-bit information, 2-bit information indicates the start symbol 1, and the other 2-bit information indicates the end symbol 1. It should be noted that in this embodiment of this application, the at least one guard time position may alternatively be a guard time boundary position or other position information. This is not limited in this embodiment of this application.

Figure 4B:
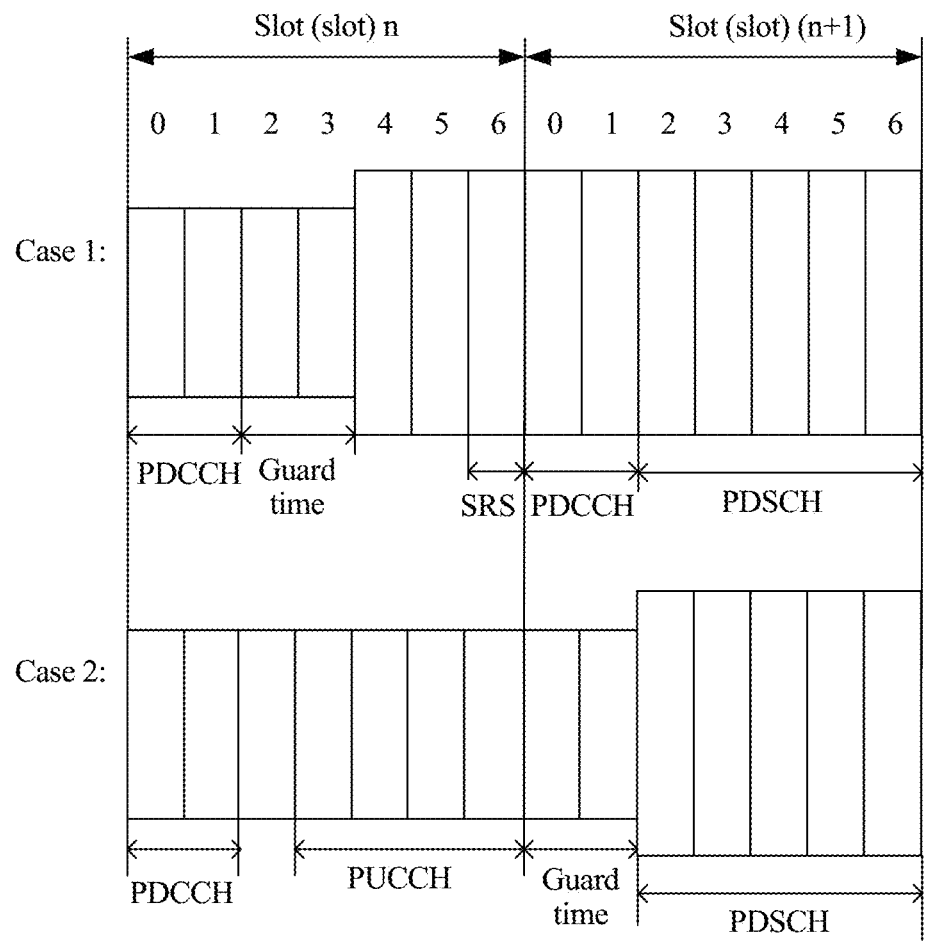

For example, a PDSCH is scheduled by using a PDCCH. It is assumed that there are K symbols between the PDCCH and the PDSCH, and a length of the guard time is GT symbols, where GT≤K. When GT<K, there may be two cases for indication. As shown in FIG. 4B, in case 1, it is specified that a start position of the guard time is located on a second symbol after a start symbol of the PDCCH. In case 2, it is specified that an end position of the guard time is located on a previous symbol of a start symbol of the PDSCH. These two cases are predefined in a protocol. After the PDCCH is received, if HARQ-ACK information of a previously scheduled PDSCH needs to be returned before the PDSCH is scheduled, it may indicate that an adjustment time is in accordance with case 2, so that the terminal device returns the HARQ-ACK information. Advantages of this method reduce impact on incomplete service transmission caused by frequency domain resource adjustment. When the UE needs to detect a PDCCH with a new bandwidth resource, or needs to send a measurement signal on a new frequency domain resource, it may indicate that a retuning time is in accordance with case 1, and channel measurement and/or scheduling on the new frequency domain resource is not affected.

Another optional implementation of the information about the guard time is as follows: The information about the guard time is used to indicate a scheduling time unit in which a start position of the guard time is located, where the start position of the guard time is a start position of a next symbol of a specific symbol in the scheduling time unit indicated by the information about the guard time, and the specific symbol is a symbol for scheduling the downlink control information.

Alternatively, the information about the guard time is used to indicate a scheduling time unit in which an end position of the guard time is located, where the end position of the guard time is a start position of the scheduling time unit indicated by the information about the guard time.

In this embodiment of this application, the start position of the guard time is the start position of the next symbol of the specific symbol in the scheduling time unit indicated by the information about the guard time, and the specific symbol is a symbol for scheduling the downlink control information. Alternatively, that the end position of the guard time is the start position of the scheduling time unit. The start position of the guard time or the end position of the guard time may be predefined, or may be notified by the base station to the terminal device. This is not limited in this embodiment of this application.

Specifically, a length of the guard time may be predefined, may be notified by the base station, or the like. A specific implementation of the length of the guard time is similar to the implementation in which the terminal device determines the length of the guard time in the another possible implementation of the information about the guard time. Details are not described herein again.

Figure 5:
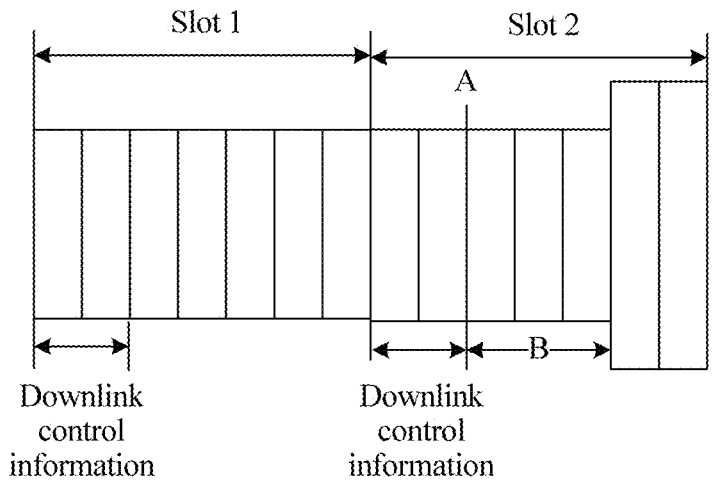
FIG. 5 is a schematic diagram of a guard time according to an embodiment of this application.

For example, it is assumed that the scheduling time unit is a slot, a quantity of symbols in one slot is 7, the length of the guard time is three symbols, and the first two symbols in one slot are used to schedule downlink control information. As shown in FIG. 5, the information about the guard time is used to indicate that the start position of the guard time is located in a slot 2. Because the start position of the guard time is a start position of a next symbol of a specific symbol in the slot 2, the start position of the guard time is A, the guard time is B, and the last two symbols are used to schedule a PDSCH. Because the downlink control information and the PDSCH are scheduled in the same slot, this is intra-slot scheduling. However, when the length of the guard time is five symbols, because the downlink control information and the PDSCH are not scheduled in one slot, this is inter-slot scheduling.

It should be noted that if the base station sends the information about the guard time to the terminal device by using the downlink control information, downlink control information transmitted in the slot 2 may include the information about the guard time, and the information about the guard time is used to indicate that the start position of the guard time is located in the slot 2. Alternatively, downlink control information transmitted in the slot 2 may not include the information about the guard time, but downlink control information transmitted in a slot 1 includes the information about the guard time. This is not limited in this embodiment of this application.

Figure 6:
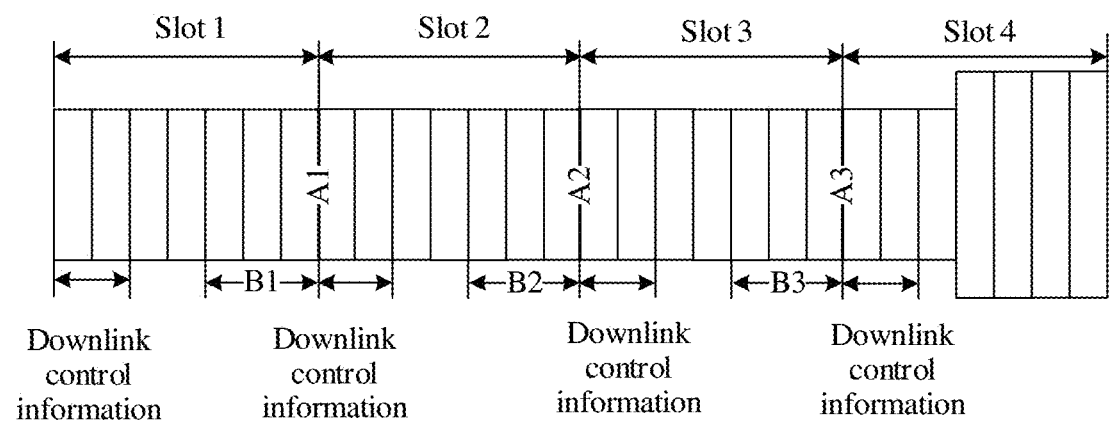
FIG. 6 is a schematic diagram of a guard time according to an embodiment of this application.

For example, as shown in FIG. 6, it is assumed that the scheduling time unit is a slot, the length of the guard time is three symbols, and the first two symbols in one slot are used to schedule downlink control information. The information about the guard time is used to indicate that the end position of the guard time is located in a slot 2. Because the end position of the guard time is a start position of a start symbol of the slot 2, the end position of the guard time is A1, and the guard time is B1. If the information about the guard time indicates a slot 3, the end position of the guard time is A2, and the guard time is B2.

In this embodiment, a possible position of the start position or the end position of the guard time is restricted, thereby reducing indication overheads. For example, if a PDSCH in a slot 4 is scheduled by using a PDCCH in the slot 1, only two bits are required to indicate a position of the guard time.

Based on a same concept, an embodiment of this application further provides an indication information sending apparatus. The apparatus is configured to perform the action or the function of the network device in the foregoing method embodiment.

Based on a same concept, an embodiment of this application further provides a frequency domain resource adjustment apparatus. The apparatus is configured to perform the action or the function of the terminal device in the foregoing method embodiment.

An embodiment of this application further provides a communications system, including the apparatuses in the foregoing embodiments.

For brevity, for details about an apparatus part, refer to the method embodiment. No repeated description is provided.

Figure 7A:
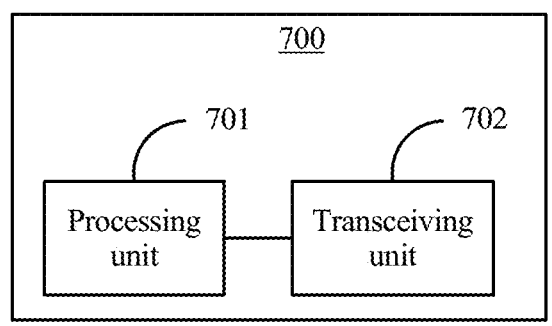
FIG. 7a and FIG. 7b are schematic structural diagrams of a frequency domain resource adjustment apparatus according to an embodiment of this application.

As shown in FIG. 7a, a frequency domain resource adjustment apparatus 700 in an embodiment of this application includes a processing unit 701 and a transceiving unit 702. The transceiving unit 702 is configured to receive information about a guard time that is sent by a network device. The processing unit 701 is configured to determine the guard time based on the information about the guard time that is received by the transceiving unit. The transceiving unit 702 is further configured to adjust a first frequency domain resource to a second frequency domain resource within the guard time determined by the processing unit.

In a possible design, the processing unit 701 is further configured to trigger the transceiving unit 702 to stop receiving or sending data within the guard time.

In a possible design, the transceiving unit 702 is configured to receive downlink control information (DCI) sent by the network device, where the DCI includes the information about the guard time.

In a possible design, the transceiving unit 702 is further configured to: before the processing unit 701 adjusts the first frequency domain resource to the second frequency domain resource within the guard time, receive indication information sent by the network device, where the indication information is used to instruct a terminal device to adjust a frequency domain resource to the second frequency domain resource; and the processing unit 701 is configured to adjust the first frequency domain resource to the second frequency domain resource within the guard time based on the indication information.

In a possible design, the transceiving unit 702 is further configured to receive first configuration information sent by the network device, where the first configuration information includes at least one frequency domain resource adjustment combination, and the indication information is used to indicate one frequency domain resource adjustment combination in the first configuration information.

In a possible design, the first configuration information further includes a length of a guard time respectively corresponding to each of the at least one frequency domain resource adjustment combination.

In a possible design, the information about the guard time includes position information of the guard time.

In a possible design, the information about the guard time includes position information of the guard time and length information of the guard time.

In a possible design, the transceiving unit 702 is further configured to receive second configuration information sent by the network device, where the second configuration information includes at least one guard time position, and the information about the guard time is used to indicate one guard time position in the second configuration information.

In a possible design, the information about the guard time is used to indicate a scheduling time unit in which a start position of the guard time is located, the start position of the guard time is a start position of a next symbol of a specific symbol in the scheduling time unit, and the specific symbol is a symbol for scheduling the downlink control information; or the information about the guard time is used to indicate a scheduling time unit in which an end position of the guard time is located, and the end position of the guard time is a start position of the scheduling time unit.

It should be understood that division of the foregoing units is merely logical function division. In actual implementation, all or some of the units may be integrated into a physical entity, or may be physically separated. In addition, all of the units may be implemented in a form of software invoked by a processing element, or may be implemented in a form of hardware; or some of the units may be implemented in a form of software invoked by a processing element; or some of the units may be implemented in a form of hardware. For example, when the apparatus can be disposed in a terminal device, the processing unit may be a separately disposed processing element, or may be integrated into a chip of the terminal device for implementation. Alternatively, the processing unit may be implemented in a form of a program stored in a memory of the terminal device, and a processing element of the terminal device invokes and executes a function of the unit. Implementation of another unit is similar to that. In addition, all or some of the units may be integrated together, or may be separately implemented. The processing element herein may be an integrated circuit and has a signal processing capability. In an implementation process, the steps in the foregoing method or the foregoing units can be implemented by using an integrated logic circuit of hardware in the processing element or by using an instruction in a form of software. In addition, the transceiving unit includes a receiving unit and a sending unit. The receiving unit is a receiving control unit, and may receive, through a receiving apparatus of the terminal device, for example, an antenna and a radio frequency apparatus, information sent by the network device. The sending unit is a sending control unit, and may send information to the network device through a sending apparatus of the terminal device, for example, the antenna and the radio frequency apparatus.

For example, the foregoing units may be one or more integrated circuits configured to implement the foregoing method, for example, one or more application-specific integrated circuits (ASIC), one or more microprocessors (digital signal processor, or DSP), or one or more field programmable gate arrays (FPGA). For another example, when a unit in the foregoing units is implemented by invoking a program by a processing element, the processing element may be a general purpose processor, for example, a central processing unit (CPU) or another processor that can invoke the program. For still another example, the units may be integrated together, and implemented in a form of a system-on-a-chip (SOC).

Figure 7B:
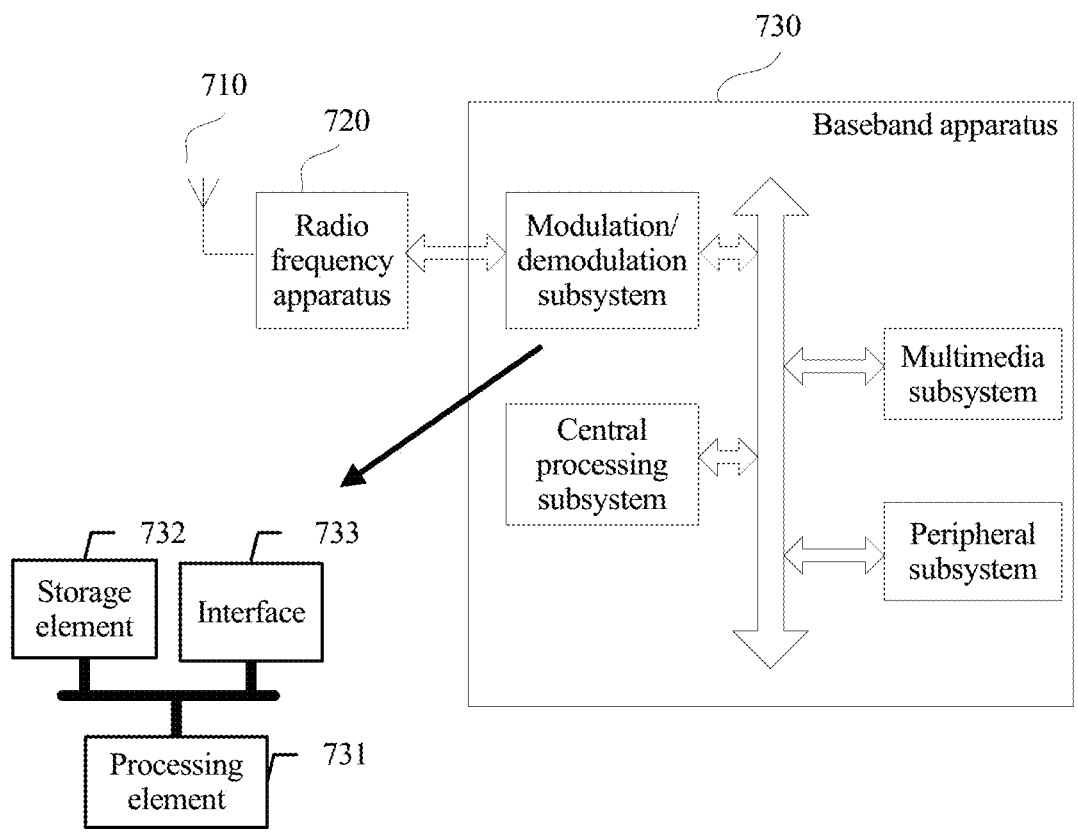

In specific implementation, the frequency domain resource adjustment apparatus 700 may be a terminal device, or may be a part of a terminal device. FIG. 7b is a schematic structural diagram of hardware of a terminal device according to an embodiment of this application. The terminal device includes an antenna 710, a radio frequency apparatus 720, and a baseband apparatus 730. The antenna 710 is connected to the radio frequency apparatus 720. In a downlink direction, the radio frequency apparatus 720 receives, through the antenna 710, information sent by a network device (for example, a base station), and sends, to the baseband apparatus 730 for processing, the information sent by the network device. In an uplink direction, the baseband apparatus 730 processes information of the terminal device, and sends the information to the radio frequency apparatus 720; and the radio frequency apparatus 720 processes the information of the terminal device, and then sends the information to the network device through the antenna 710.

The baseband apparatus 730 may include a modulation/demodulation subsystem, configured to process data at each communications protocol layer, and may further include a central processing subsystem, configured to process an operating system and an application layer of the terminal device. In addition, the baseband apparatus 730 may further include other subsystems such as a multimedia subsystem and a peripheral subsystem. The multimedia subsystem is configured to control a terminal camera, screen display, and the like. The peripheral subsystem is configured to implement a connection to another device. The modulation/demodulation subsystem may be a separately disposed chip. Optionally, the foregoing processing unit 701 may be implemented in the modulation/demodulation subsystem.

In an implementation, each unit shown in FIG. 7b is implemented by invoking a program by a processing element. For example, a subsystem such as the modulation/demodulation subsystem of the baseband apparatus 730 includes a processing element 731 and a storage element 732. The processing element 731 invokes a program stored in the storage element 732, to perform the method performed by the terminal device in the foregoing method embodiment.

In addition, the baseband apparatus 730 may further include an interface 733, configured to exchange information with the radio frequency apparatus 720.

In another implementation, each unit shown in FIG. 7b may be one or more processing elements configured to implement the foregoing method performed by the terminal device. The processing elements are disposed in a subsystem such as the modulation/demodulation subsystem of the baseband apparatus 730. The processing element herein may be an integrated circuit, for example, one or more ASICs, one or more DSPs, or one or more FPGAs. These integrated circuits may be integrated together to form a chip.

For example, all the units shown in FIG. 7b may be integrated together, and implemented in a form of an SOC. For example, the baseband apparatus 730 includes an SOC chip configured to implement the foregoing method. A processing element 731 and a storage element 732 may be integrated into the chip; and the processing element 731 invokes a program stored in the storage element 732, to implement the foregoing method performed by the terminal device or the function of each unit shown in FIG. 7a. Alternatively, at least one integrated circuit may be integrated into the chip, to implement the foregoing method performed by the terminal device or the function of each unit shown in FIG. 7a. Alternatively, with reference to the foregoing implementations, functions of some units may be implemented by invoking a program by a processing element, and functions of some units may be implemented in a form of an integrated circuit.

In any manner, in conclusion, the terminal device in this embodiment of this application includes at least one processing element and storage element. The at least one processing element is configured to perform the method that is performed by the terminal device and that is provided in the foregoing method embodiment. The processing element may perform, in a first manner, namely, in a manner of executing a program stored in the storage element, some or all of the steps performed by the terminal device in the foregoing method embodiment, or may perform, in a second manner, namely, in a manner of combining an integrated logical circuit of hardware in the processing element with an instruction, some or all of the steps performed by the terminal device in the foregoing method embodiment, or certainly may perform, with reference to the first manner and the second manner, some or all of the steps performed by the terminal device in the foregoing method embodiment.

As described above, the processing element herein may be a general purpose processor, for example, a CPU, or may be one or more integrated circuits configured to implement the foregoing method, for example, one or more ASICs, one or more DSPs, or one or more FPGAs.

The storage element may be a memory, or may be a general term of a plurality of storage elements.

Figure 8A:
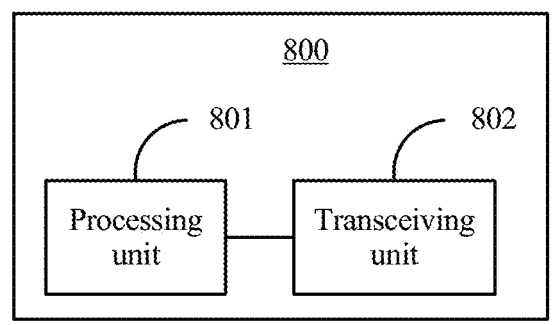
FIG. 8a and FIG. 8b are schematic structural diagrams of an indication information sending apparatus according to an embodiment of this application.

As shown in FIG. 8a, an indication information sending apparatus 800 in an embodiment of this application includes a processing unit 801 and a transceiving unit 802. The processing unit 801 is configured to determine to adjust a frequency domain resource of a terminal device from a first frequency domain resource to a second frequency domain resource. The transceiving unit 802 is configured to send information about a guard time to the terminal device. The guard time is used for the terminal device to adjust the first frequency domain resource to the second frequency domain resource.

In a possible design, the transceiving unit 802 is configured to send downlink control information (DCI) to the terminal device. The DCI includes the information about the guard time.

In a possible design, the transceiving unit 802 is further configured to send indication information to the terminal device before sending the information about the guard time to the terminal device. The indication information is used to instruct the terminal device to adjust a frequency domain resource to the second frequency domain resource.

In a possible design, the transceiving unit 802 is further configured to send first configuration information to the terminal device. The first configuration information includes at least one frequency domain resource adjustment combination, and the indication information is used to indicate one frequency domain resource adjustment combination in the first configuration information.

In a possible design, the first configuration information further includes a length of a guard time respectively corresponding to each of the at least one frequency domain resource adjustment combination.

In a possible design, the information about the guard time includes position information of the guard time.

In a possible design, the information about the guard time includes position information of the guard time and length information of the guard time.

In a possible design, the transceiving unit 802 is further configured to send second configuration information to the terminal device. The second configuration information includes at least one guard time position, and the information about the guard time is used to indicate one guard time position in the second configuration information.

In a possible design, the information about the guard time is used to indicate a scheduling time unit in which a start position of the guard time is located, the start position of the guard time is a start position of a next symbol of a specific symbol in the scheduling time unit, and the specific symbol is a symbol for scheduling the downlink control information; or the information about the guard time is used to indicate a scheduling time unit in which an end position of the guard time is located, and the end position of the guard time is a start position of the scheduling time unit.

It should be understood that division of the foregoing units is merely logical function division. In actual implementation, all or some of the units may be integrated into a physical entity, or may be physically separated. In addition, all of the units may be implemented in a form of software invoked by a processing element, or may be implemented in a form of hardware; or some of the units may be implemented in a form of software invoked by a processing element; or some of the units may be implemented in a form of hardware. For example, when the apparatus 800 is disposed in a network device, the processing unit may be a separately disposed processing element, or may be integrated into a chip of the network device for implementation. Alternatively, the processing unit may be implemented in a form of a program stored in a memory of the network device, and a processing element of the network device invokes and executes a function of the unit. Implementation of another unit is similar to that. In addition, all or some of the units may be integrated together, or may be separately implemented. The processing element herein may be an integrated circuit and has a signal processing capability. In an implementation process, the steps in the foregoing method or the foregoing units can be implemented by using an integrated logic circuit of hardware in the processing element or by using an instruction in a form of software. In addition, the transceiving unit includes a receiving unit and a sending unit. The receiving unit is a receiving control unit, and may receive, through a receiving apparatus of the network device, for example, an antenna and a radio frequency apparatus, information sent by the terminal device. The sending unit is a sending control unit, and may send information to the terminal device through a sending apparatus of the network device, for example, the antenna and the radio frequency apparatus.

For example, the foregoing units may be one or more integrated circuits configured to implement the foregoing method, for example, one or more ASICs, one or more DSPs, or one or more FPGAs. For another example, when a unit in the foregoing units is implemented by invoking a program by a processing element, the processing element may be a general purpose processor, for example, a CPU or another processor that can invoke the program. For still another example, the units may be integrated together, and implemented in a form of an SOC.

Figure 8B:
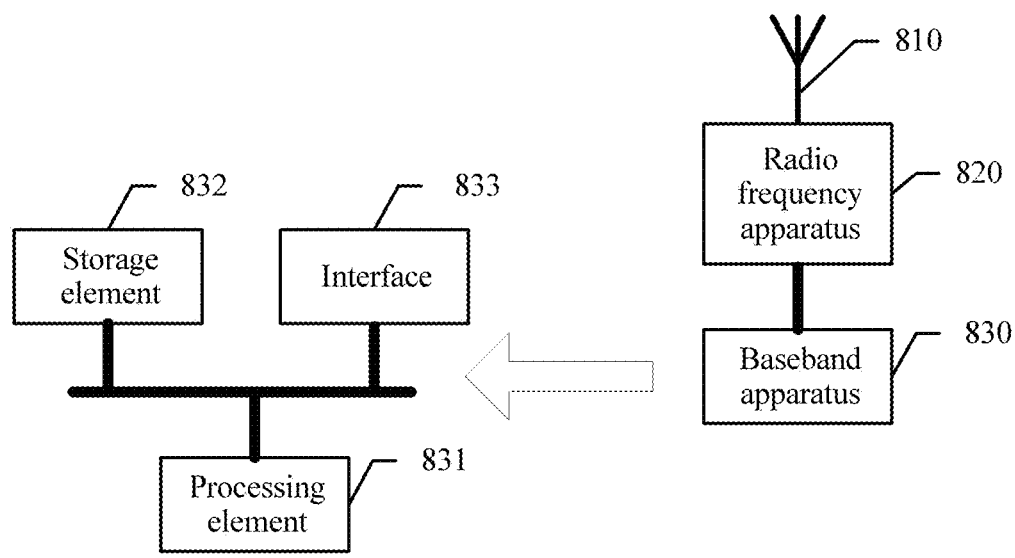

In specific implementation, the indication information sending apparatus 800 may be a network device, or may be a part of a network device. FIG. 8b is a schematic structural diagram of hardware of a network device according to an embodiment of this application. The network device includes an antenna 810, a radio frequency apparatus 820, and a baseband apparatus 830. The antenna 810 is connected to the radio frequency apparatus 820. In an uplink direction, the radio frequency apparatus 820 receives, through the antenna 810, information sent by a terminal device, and sends, to the baseband apparatus 830 for processing, the information sent by the terminal device. In a downlink direction, the baseband apparatus 830 processes information of the terminal device, and sends the information to the radio frequency apparatus 820; and the radio frequency apparatus 820 processes the information of the terminal device, and then sends the information to the terminal device through the antenna 810.

The baseband apparatus 830 may be a physical apparatus, or may include at least two apparatuses that are physically separated, for example, include a central unit (CU) and at least one distributed unit (DU). The DU and the radio frequency apparatus 820 may be integrated into an apparatus, or may be physically separated. Division of the at least two apparatuses that are physically separated in the baseband apparatus 830 at protocol layers is not limited. For example, the baseband apparatus 830 is configured to perform processing of protocol layers such as RRC, packet data convergence protocol (PDCP), radio link control (RLC), media access control (MAC), and a physical layer. Division may be performed between any two protocol layers, so that the baseband apparatus includes two apparatuses that are physically separated and that are respectively configured to perform processing of protocol layers for which the two apparatuses are respectively responsible. For example, division is performed between the RRC and the PDCP. For another example, division may be performed between the PDCP and the RLC. Alternatively, division may be performed at a protocol layer. For example, a part of a protocol layer and a protocol layer above the protocol layer are assigned to an apparatus, and the remaining parts of the protocol layer and a protocol layer below the protocol layer are assigned to another apparatus. The processing unit 801 may be located in one of the at least two apparatuses that are physically separated in the baseband apparatus 830.

The network device may include a plurality of baseband boards. A plurality of processing elements may be integrated on a baseband board to implement a required function. The baseband apparatus 830 may include at least one baseband board, and the processing unit 801 may be located in the baseband apparatus 830. In an implementation, each unit shown in FIG. 8a is implemented by invoking a program by a processing element. For example, the baseband apparatus 830 includes a processing element 831 and a storage element 832. The processing element 831 invokes a program stored in the storage element 832, to perform the method performed by the network device in the foregoing method embodiment. In addition, the baseband apparatus 830 may further include an interface 833, configured to exchange information with the radio frequency apparatus 820. The interface is, for example, a common public radio interface (CPRI). When the baseband apparatus 830 and the radio frequency apparatus 820 are physically deployed together, the interface may be an intra-board interface or an inter-board interface. The board herein is a circuit board.

In another implementation, each unit shown in FIG. 8a may be one or more processing elements configured to implement the foregoing method performed by the network device. The processing elements are disposed in the baseband apparatus 830. The processing element herein may be an integrated circuit, for example, one or more ASICs, one or more DSPs, or one or more FPGAs. These integrated circuits may be integrated together to form a chip.

For example, all the units shown in FIG. 8a may be integrated together, and implemented in a form of an SOC. For example, the baseband apparatus 830 includes an SOC chip configured to implement the foregoing method. A processing element 831 and a storage element 832 may be integrated into the chip; and the processing element 831 invokes a program stored in the storage element 832, to implement the foregoing method performed by the network device or the function of each unit shown in FIG. 8a. Alternatively, at least one integrated circuit may be integrated into the chip, to implement the foregoing method performed by the network device or the function of each unit shown in FIG. 8a. Alternatively, with reference to the foregoing implementations, functions of some units may be implemented by invoking a program by a processing element, and functions of some units may be implemented in a form of an integrated circuit.

In any manner, in conclusion, the network device includes at least one processing element and storage element, where the at least one processing element is configured to perform the method that is performed by the network device and that is provided in the foregoing method embodiment. The processing element may perform, in a first manner, namely, in a manner of executing a program stored in the storage element, some or all of the steps performed by the network device in the foregoing method embodiment; or may perform, in a second manner, namely, in a manner of combining an integrated logical circuit of hardware in the processing element with an instruction, some or all of the steps performed by the network device in the foregoing method embodiment; or certainly may perform, by combining the first manner and the second manner, some or all of the steps performed by the network device in the foregoing method embodiment.

As described above, the processing element herein may be a general purpose processor, for example, a CPU; or may be one or more integrated circuits configured to implement the foregoing method, for example, one or more ASICs, one or more DSPs, or one or more FPGAs.

The storage element may be a memory, or may be a general term of a plurality of storage elements.

Figure 9:
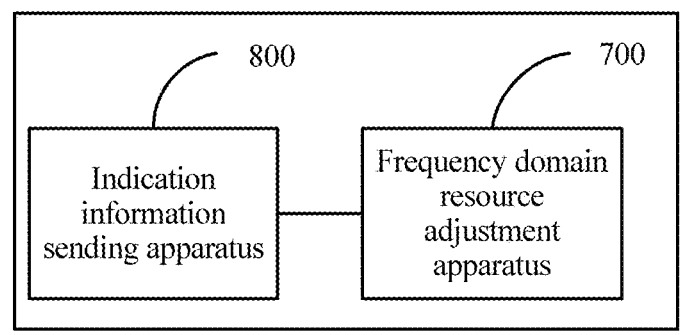
FIG. 9 is a schematic structural diagram of a communications system according to an embodiment of this application.

As shown in FIG. 9, a communications system in an embodiment of this application includes the frequency domain resource adjustment apparatus 700 and the indication information sending apparatus 800.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer usable storage media (including but not limited to a disk memory, a CD-ROM, and an optical memory) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, persons skilled in the art can make changes and modifications to these embodiments once they learn the basic inventive concept. Therefore, the appended claims are intended to be construed as to cover the embodiments of this application and all changes and modifications falling within the scope of this application.

Apparently, persons skilled in the art can make various modifications and variations to this application without departing from the spirit and scope of this application. In this way, this application is also intended to cover these modifications and variations to this application provided that they fall within the scope of the claims of this application and equivalent technologies thereof.

What is claimed is:

1. A method comprising:
    receiving, by a terminal device, information about a guard time from a network device;
    determining, by the terminal device, the guard time based on the information about the guard time, the guard time being a period of time during which the terminal device is configured to change a frequency domain resource for communication of the terminal device; and
    adjusting, by the terminal device during the guard time, the frequency domain resource for communication from a first frequency domain resource to a second frequency domain resource.

2. The method according to claim 1, wherein the terminal device stops receiving or sending data during the guard time.

3. The method according to claim 1, wherein receiving, by the terminal device, the information about the guard time from the network device comprises:
    receiving, by the terminal device, downlink control information (DCI) from the network device, wherein the DCI comprises the information about the guard time.

4. The method according to claim 1, wherein the method further comprises:
    receiving, by the terminal device, indication information from the network device, wherein the indication information instructs the terminal device to adjust the frequency domain resource to the second frequency domain resource; and
    adjusting, by the terminal device, the frequency domain resource from the first frequency domain resource to the second frequency domain resource comprises:
    adjusting, by the terminal device, the frequency domain resource from the first frequency domain resource to the second frequency domain resource based on the indication information.

5. The method according to claim 4, wherein the method further comprises:
    receiving, by the terminal device, first configuration information from the network device, wherein the first configuration information comprises at least one frequency domain resource adjustment combination, and the indication information indicates a first frequency domain resource adjustment combination of the at least one frequency domain resource adjustment combination in the first configuration information, each of the at least one frequency domain resource adjustment combination comprising a frequency domain resource before a frequency domain resource adjustment and a frequency domain resource after the frequency domain resource adjustment, and the first frequency domain resource adjustment combination comprising the first frequency domain resource and the second frequency domain resource.

6. The method according to claim 5, wherein the first configuration information further comprises a length of a guard time respectively corresponding to each of the at least one frequency domain resource adjustment combination.

7. The method according to claim 1, wherein the information about the guard time comprises position information of the guard time in a time domain.

8. The method according to claim 1, wherein the information about the guard time comprises position information of the guard time in a time domain and length information of the guard time.

9. The method according to claim 1, further comprising:
    receiving, by the terminal device, second configuration information from the network device, wherein the second configuration information comprises at least one guard time position in a time domain, and the information about the guard time indicates a guard time position in the second configuration information.

10. The method according to claim 1, wherein the information about the guard time indicates a scheduling time unit in which a start position of the guard time is located, the start position of the guard time is a start position of a next symbol of a specific symbol in the scheduling time unit, and the specific symbol is a symbol for scheduling downlink control information; or the information about the guard time indicates a scheduling time unit in which an end position of the guard time is located, and the end position of the guard time is a start position of the scheduling time unit.

11. An apparatus comprising:
a non-transitory memory storage comprising instructions; and
one or more processors in communication with the memory storage, wherein the instructions, when executed by the one or more processors, cause the apparatus to:
receive information about a guard time from a network device;
determine the guard time based on the information about the guard time, the guard time being a period of time during which the apparatus is configured to change a frequency domain resource for communication of the apparatus; and
adjust, during the guard time, the frequency domain resource for communication from a first frequency domain resource to a second frequency domain resource within the guard time.

12. The apparatus according to claim 11, wherein the apparatus stops receiving or sending data during the guard time.

13. The apparatus according to claim 11, wherein the instructions, when executed by the one or more processors, cause the apparatus to further:
receive, from the network device, downlink control information (DCI) that comprises the information about the guard time.

14. The apparatus according to claim 11, wherein the instructions, when executed by the one or more processors, cause the apparatus to further:
receive indication information from the network device, wherein the indication information instructs the apparatus to adjust the frequency domain resource to the second frequency domain resource; and
adjust the frequency domain resource from the first frequency domain resource to the second frequency domain resource based on the indication information.

15. The apparatus according to claim 14, wherein the instructions, when executed by the one or more processors, causes the apparatus to further:
receive first configuration information from the network device, wherein the first configuration information comprises at least one frequency domain resource adjustment combination, and the indication information indicates a first frequency domain resource adjustment combination of the at least one frequency domain resource adjustment combination in the first configuration information, each of the at least one frequency domain resource adjustment combination comprising a frequency domain resource before a frequency domain resource adjustment and a frequency domain resource after the frequency domain resource adjustment, and the first frequency domain resource adjustment combination comprising the first frequency domain resource and the second frequency domain resource.

16. The apparatus according to claim 15, wherein the first configuration information further comprises a length of a guard time respectively corresponding to each of the at least one frequency domain resource adjustment combination.

17. The apparatus according to claim 11, wherein the information about the guard time comprises position information of the guard time or comprises position information of the guard time and length information of the guard time in a time domain.

18. The apparatus according to claim 11, wherein the instructions, when executed by the one or more processors, causes the apparatus to further:
receive second configuration information from the network device, wherein the second configuration information comprises at least one guard time position in a time domain, and the information about the guard time indicates a guard time position in the second configuration information.

19. The apparatus according to claim 11, wherein the information about the guard time indicates a scheduling time unit in which a start position of the guard time is located, the start position of the guard time is a start position of a next symbol of a specific symbol in the scheduling time unit, and the specific symbol is a symbol for scheduling downlink control information; or the information about the guard time indicates a scheduling time unit in which an end position of the guard time is located, and the end position of the guard time is a start position of the scheduling time unit.

20. An apparatus comprising:
a non-transitory memory storage comprising instructions; and
one or more processors in communication with the memory storage, wherein the instructions, when executed by the one or more processors, cause the apparatus to:
determine to adjust a frequency domain resource of a terminal device from a first frequency domain resource to a second frequency domain resource for communication of the terminal device; and
send information about a guard time to the terminal device, instructing the terminal device to adjust the frequency domain resource of the terminal device from the first frequency domain resource to the second frequency domain resource during the guard time.

* * * * *